United States Patent
Guldner et al.

(10) Patent No.: US 7,398,338 B2
(45) Date of Patent: Jul. 8, 2008

(54) FLEXIBLE AND ERROR RESISTANT DATA BUFFERING AND CONNECTIVITY

(75) Inventors: Andreas Guldner, Ueberhern (DE); Marcus Lotz, Saarabruecken (DE)

(73) Assignee: SAP AG, Walldorf (DE)

( * ) Notice: Subject to any disclaimer, the term of this patent is extended or adjusted under 35 U.S.C. 154(b) by 562 days.

(21) Appl. No.: 11/028,241

(22) Filed: Jan. 4, 2005

(65) Prior Publication Data

US 2006/0004934 A1    Jan. 5, 2006

Related U.S. Application Data

(60) Provisional application No. 60/583,894, filed on Jun. 30, 2004, provisional application No. 60/623,245, filed on Nov. 1, 2004.

(51) Int. Cl.
*G06F 3/00* (2006.01)
*G06F 7/00* (2006.01)
(52) U.S. Cl. .................. 710/52; 707/8; 707/201
(58) Field of Classification Search .............. 707/8, 707/201, 203, 205; 710/52–55; 711/113
See application file for complete search history.

(56) References Cited

U.S. PATENT DOCUMENTS

| 5,706,511 | A | * | 1/1998 | Tomoda ............... 707/205 |
| 6,295,610 | B1 | * | 9/2001 | Ganesh et al. ............ 714/19 |
| 6,745,283 | B1 | * | 6/2004 | Dang ................... 711/113 |
| 6,862,660 | B1 | * | 3/2005 | Wilkins et al. .......... 711/113 |
| 7,233,946 | B1 | * | 6/2007 | McPolin ................. 707/8 |
| 7,233,947 | B2 | * | 6/2007 | Lomet .................. 707/8 |

* cited by examiner

*Primary Examiner*—Christopher Shin
(74) *Attorney, Agent, or Firm*—Kenyon & Kenyon LLP

(57) ABSTRACT

One embodiment of the invention includes a method of buffering data between an upstream system sending data to a buffer and a downstream system obtaining data from the buffer. This method may include receiving a data record containing a status flag and a position identifier, reading the status flag and the position identifier of the received data record, and searching an existing buffer location associated with the received position identifier. In some instances, when the existing buffer location associated with the received position identifier has an existing record associated with the received position identifier, the condition of a processing flag associated with the existing record and buffering the received data at the buffer location may be reviewed and subsequent updates to a processing flag may be made.

23 Claims, 5 Drawing Sheets

Figure 4

```
 (401)            (403)
(I, U or D)     (N, P or E)          400  Data
   402             402                    Record
```

```
4 4                                  4
5 5              452                 5   450 Data
1 1                                  3       Record
```

Figure 5

| | | | | |
|---|---|---|---|---|
| 501 | I | + | I | = | I |
| 502 | D | + | I | = | D |
| 503 | U | + | I | = | I |
| 504 | I | + | D | = | U |
| 505 | D | + | D | = | D |
| 506 | U | + | D | = | U |
| 507 | I | + | U | = | U |
| 508 | D | + | U | = | D |
| 509 | U | + | U | = | U |
| 510 | I | + | () | = | I |
| 511 | D | + | () | = | D |
| 512 | U | + | () | = | U |

500

Data Flag
Logic Table

FLEXIBLE AND ERROR RESISTANT DATA BUFFERING AND CONNECTIVITY

This application claims the benefit of provisional application 60/583,894, filed on Jun. 30, 2004, and entitled "Retail Forecast Replenishment Engine," and provisional application 60/623,245, filed Nov. 1, 2004, and entitled "Flexible and Error Resistant Data Buffering and Connectivity." Those applications are incorporated herein, in their entirety, by reference.

FIELD OF THE INVENTION

The present invention regards a buffering method, system or apparatus for transferring data between two or more systems, computers, or objects. More specifically, the present invention regards a buffering method, system or apparatus that codes large volumes of data received from an upstream data source such that the data may be efficiently and accurately gathered and catalogued until such time that it may be retrieved by a downstream system for subsequent processing and analysis.

BACKGROUND

Sales organizations often gather large volumes of data in order to analyze and study the progress and efficiencies of their business. The data that may be gathered can depend on the type of business operation (i.e., retail, wholesale, etc.) as well as upon where the business is operating. In other words, depending upon the operation being evaluated, the type of collected data may differ within an industry or within a specific geographic region. Likewise, the analysis that may be performed with the stored data may also vary by region, division, organization, and industry. Some of the data that may be gathered and subsequently analyzed includes: (a) daily sales data by product, price, and size; (b) inventory levels, again by product, price, and size; and, (c) daily operating costs including prorated salaries, rent, and advertising at each retail facility.

In each of these instances, the intake of data can be cumbersome, not only because of the enormous volume of information but also due to the sporadic fashion in which the data may be sent.

BRIEF DESCRIPTION OF THE DRAWINGS

FIG. 4 is a data record with flags that may be employed in accord with an embodiment of the present invention.

FIG. 5 is a logic table as may be employed in accord with an embodiment of the present invention.

DETAILED DESCRIPTION

One embodiment of the invention includes a method of buffering data between an upstream system sending data to a buffer and a downstream system obtaining data from the buffer. This method may include receiving a data record containing a status flag and a position identifier, reading the status flag and the position identifier of the received data record, and searching an existing buffer location associated with the received position identifier. In some instances, when the existing buffer location associated with the received position identifier has an existing record associated with the received position identifier, the condition of a processing flag associated with a target buffer location may be reviewed and subsequent updates to the processing flag may be made.

In one embodiment of the present invention, information needed for subsequent downstream analysis may be packaged into records, assigned one or more flags, and transmitted to a buffer. In this embodiment, the processing buffer may receive the records, review the accompanying flags, and act on each record depending upon the status of the flags. In some instances, the data record will be new and it will be stored without modification. In other instances, the data record will be an updated version of an earlier data record such that the older record may be updated to include the new updated fields. In still more instances, the record may supercede an existing record and will be slated for deletion at a future time. The status of these updates and revisions may be reflected in the records with an additional flag designated to indicate the processing status of the record.

Data records may also be retrieved from the buffer. This may done in response to a downstream system query and may occur while the buffer is being populated or updated as well as after data has been stored in the buffer. To reduce the likelihood that partially processed or updated data is sent in response to a retrieval query, a processing flag may also be associated with the buffer storage location. This flag may be set to indicate when a record is being processed and when it is not. When the record is begin processed, the data stored or partially stored therein should not be accessed. Rather, only after the record update is complete, should the data in the buffer be accessed in response to a query.

Through the use of the buffer, the upstream and downstream systems need not communicate directly with each other or even be compatible with each other. Instead, the upstream and downstream systems only need to be able to communicate with the interface buffer in order to have data or other information catalogued there and subsequently retrieved.

Figure 1:
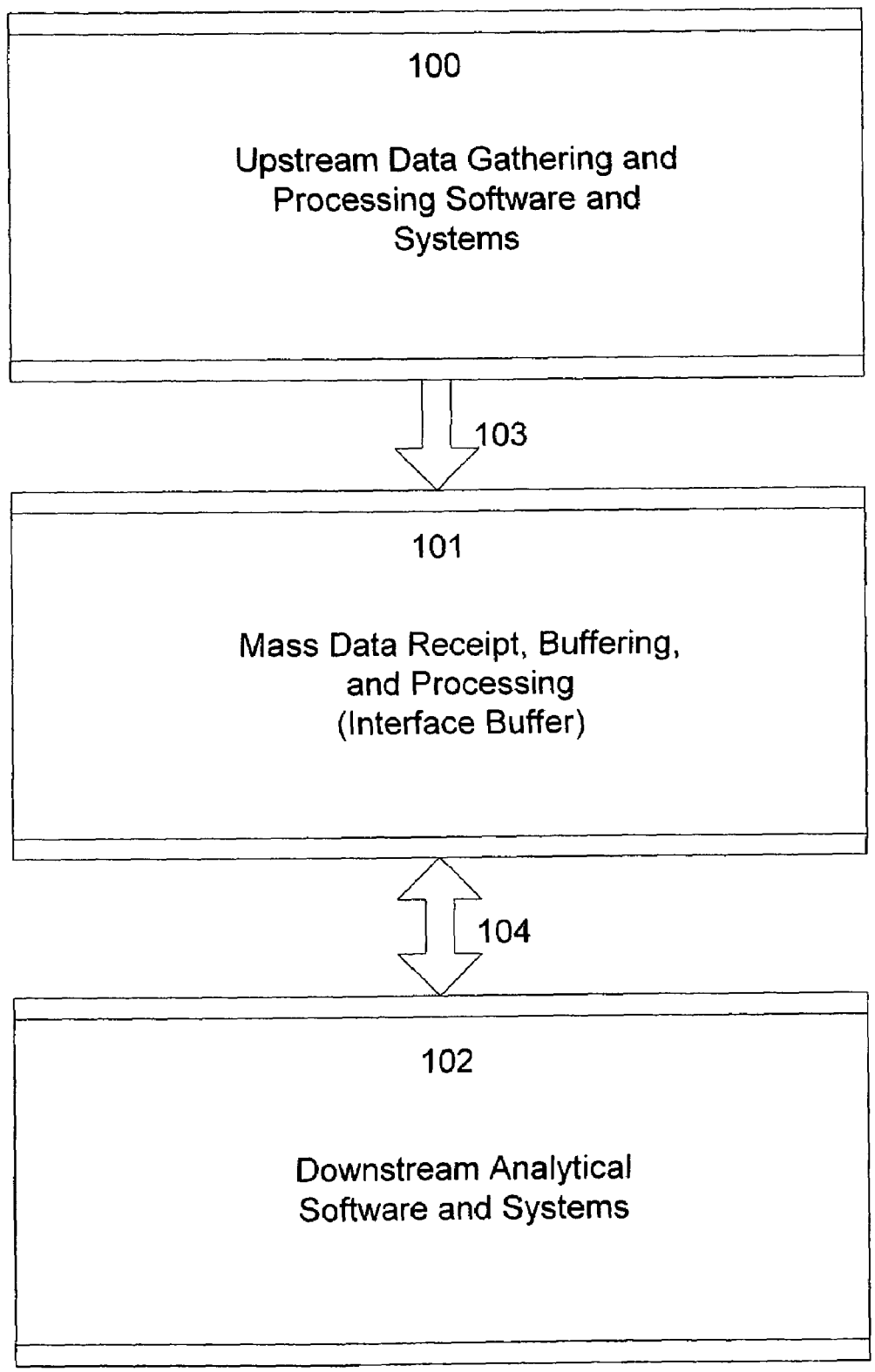
FIG. 1 is an overview of a method that may be employed in accord with the present invention.

FIG. 1 is a flow chart showing a process that may be used in accord with an embodiment of the present invention. In this method or process large quantities of data may be gathered, indexed, and then retrieved for subsequent use. This data may be generated during business operations, scientific studies, and through other applications as well. In the embodiment described in FIG. 1, at step 100, data or other information may be gathered for subsequent use and analysis by one or more upstream systems. These upstream systems may include a single computing system, a networked system, and other data gathering or data generating systems. As shown by arrow 103, these various systems may then send the information to an interface buffer as shown in box 101. When the data is transferred by the upstream system it may be manipulated, catalogued or otherwise supplemented prior to its receipt by the interface buffer 101. This cataloguing, manipulation or supplementation may include the introduction of flags or other signals that identify what the data is and/or where it should be stored. Based upon these flags or other signals, the interface buffer may catalogue or otherwise hold the received data at step 101. At step 102, a downstream system may retrieve data from the interface buffer in order to use the data in subsequent manipulations or calculations. This downstream system may an independent system accessing the buffer across a wide area network as well as a different portion of the system that transferred the data into the interface buffer. It may be a hybrid of these systems as well.

In one embodiment the upstream systems may include Point of Sale (POS) systems, such as those that collect sale price, product name, product type, and date of sale, at retail facilities. The upstream systems may also be purchasing systems, inventory systems, ordering systems, and other data systems that track the operation of a business. They may be other systems as well. In these as well as others uses the number of data records generated and ultimately stored may be significant, reaching well into the hundreds of thousands of records.

The upstream systems may be linked to one another such that they share data and other information between them. They may be wholly independent as well, requiring independent programming and maintenance in order to perform their intended system function. The upstream systems may be previously chosen to gather data that may be important to run a specific organization and business. Likewise, the upstream systems may be used to provide certain data for subsequent downstream analysis, analysis that may be helpful in increasing or otherwise improving the operation of the business.

In one embodiment, the downstream systems may be forecast and replenishment systems that help manage the activities of a business or scientific study system that analyzes an experiment or other environmental system to increase scientific knowledge. Like the upstream systems, the downstream systems, may be linked to one another such that they share data and other information between them. They may be wholly independent as well, requiring independent programming and maintenance in order to perform their intended system function. Moreover, the downstream systems may be previously chosen to gather data that may be important to run a specific organization and business. Likewise, the downstream systems may be used to provide certain analysis for strategic decision making. Analysis that may be helpful in increasing or otherwise improving the operation of the business or understanding an event. Through the use of the interface buffer it is not necessary in an embodiment of the present invention to have the upstream and downstream systems programmed to communicate with each other. Rather, they may be compatible with the interface buffer but not with themselves. In other embodiments, however, the upstream and downstream systems may communicate with each other in addition to using the interface buffer.

Figure 2:
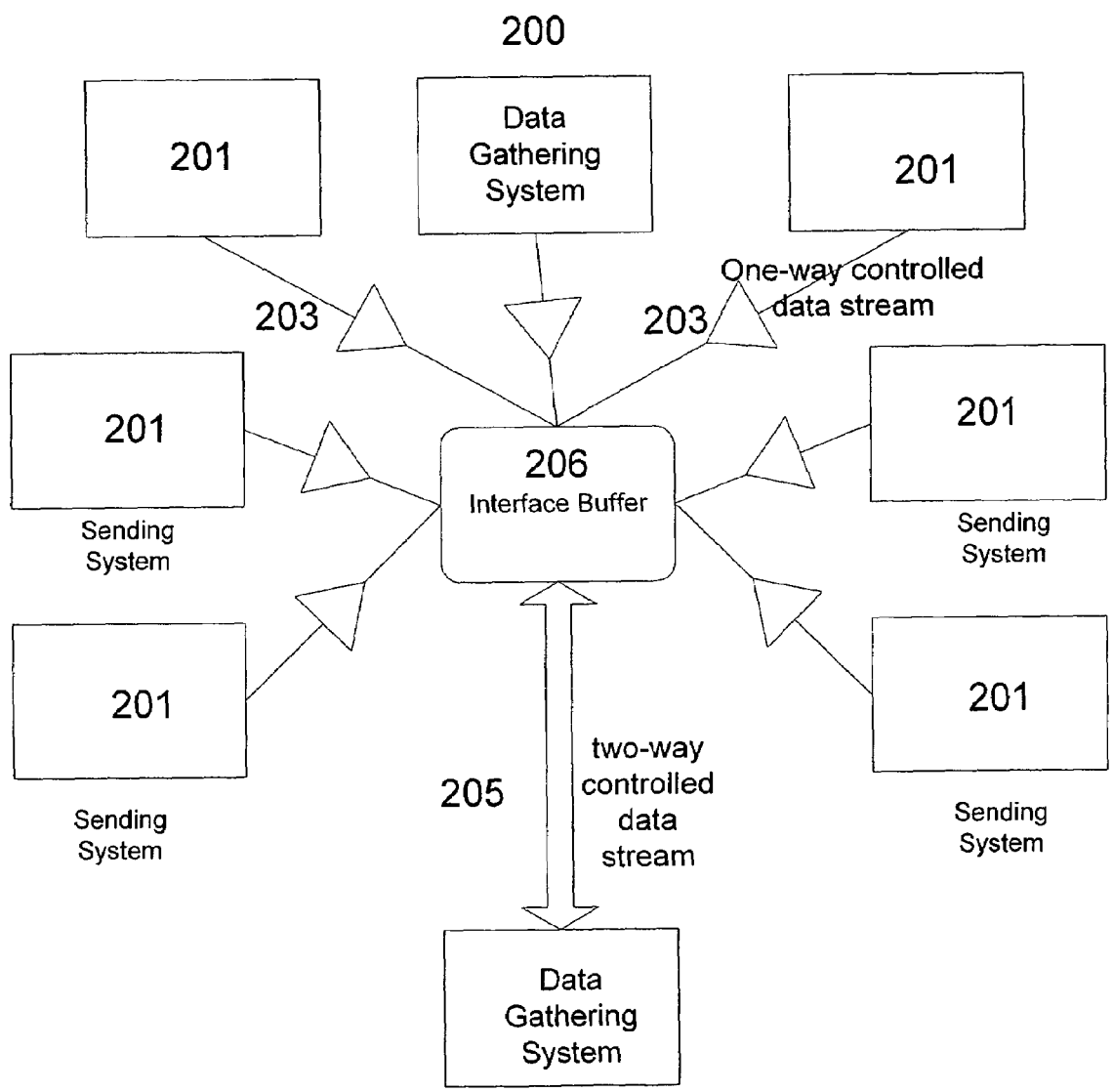
FIG. 2 is system that may be employed in accord with an embodiment of the present invention.

FIG. 2 shows a network that may be employed in accord with an embodiment of the present invention. As can be seen in FIG. 2, the interface buffer 206 may receive data or other information from numerous sources 201. These data gathering systems 201 may each be running similar or different software, however, it is preferred that each system 201 sending information to the interface buffer 206 provide flags or other indicators that allow the interface buffer to catalogue the received data. A downstream data gathering system 205 is also shown in FIG. 2. This downstream system 205 may query the buffer 206. This query and retrieval of data is shown at arrow 205, which is labeled two-way controlled data stream.

As noted earlier, in this embodiment while each data gathering system 201 is labeled identically, these systems may be different or at least be supplying different types of data to the buffer 206. In addition, while one-way communication is indicated in the Figure between buffer 206 and gathering systems 201, these systems may participate in two-way communications. For example, the buffer may send error instructions back to the gathering systems 201 if received data does not contain an expected indicator.

Figure 3:
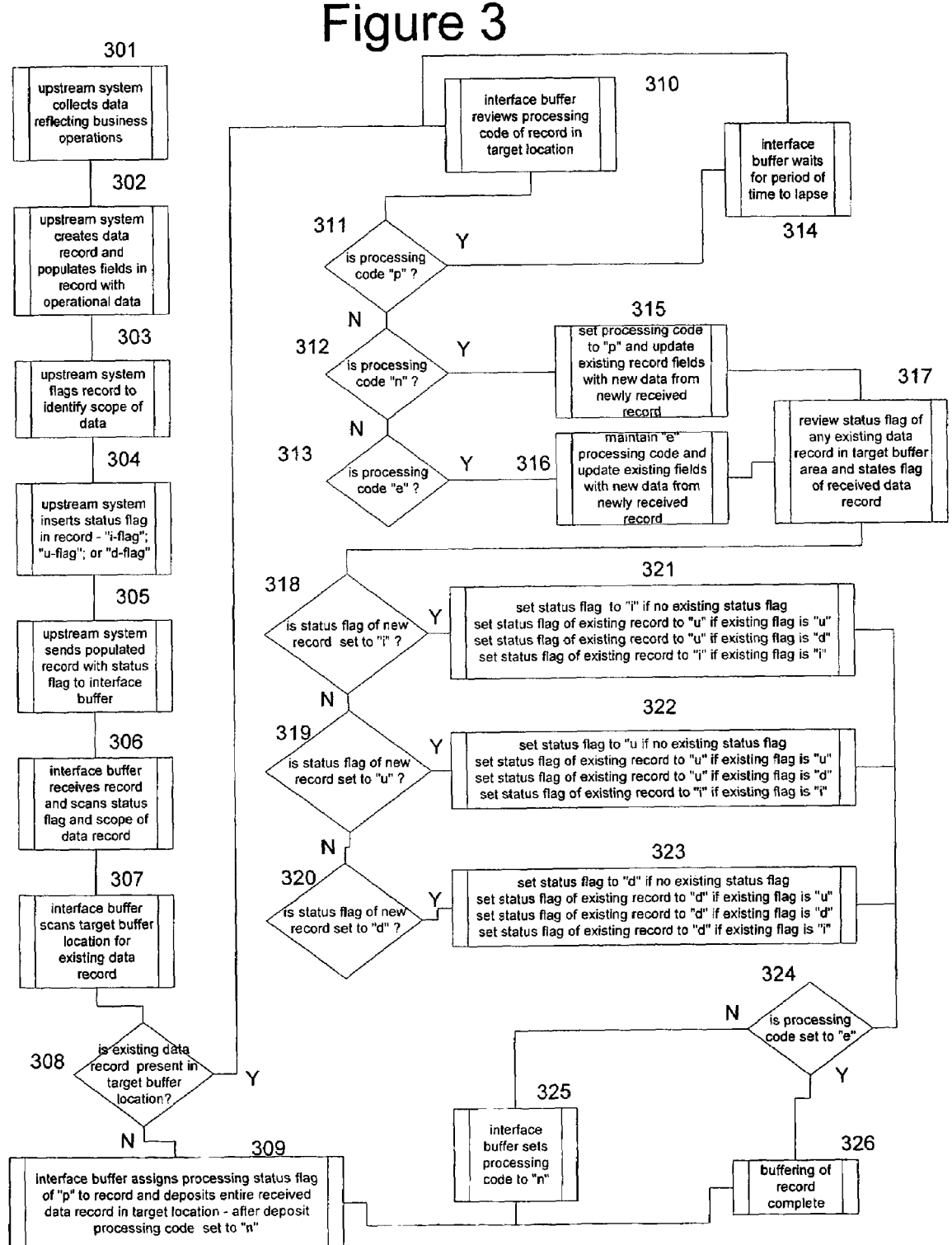
FIG. 3 is a flow chart of a method that may be employed in accord with an embodiment of the present invention.

FIG. 3 illustrates a method according to another embodiment of the present invention. While these steps are shown in one order in this embodiment, they may be performed in others as well. Moreover, these steps may also be performed in tandem or consecutively in some embodiments. In this embodiment, an upstream system may collect data reflecting business operation or other information at step 301. Then, at step 302, this upstream system may then create a data record and populate that data record with the data. At step 303, the upstream system may associate an indicator with the record in order to instruct a recipient of the record what is contained in the record. This indicator may provide information that includes the scope of data and when it was stored or generated. At about the same time, a status flag or other indicator may also be placed within or otherwise associated with the data record. This is shown at step 305. This status flag may classify the data record as being an insert record, a delete record or an updated record, the status flags accordingly described as "i-flags" "d-flags" and "u-flags." These populated and labeled records may then be sent by the upstream system to an interface buffer for buffering. Upon receiving the record, as shown at 306, the interface buffer may review the status flag and the data indicator associated with the record in order to determine where the record should be catalogued and what to do with any existing record in the same location.

As shown at 308 and 309, if no data record exists in the target location identified by the newly received data record, the interface buffer may assign a "p" processing flag to the record while the data from the record is stored in the target location. Once the data record has been processed, the processing code may be changed to "n" by the interface buffer as shown at 309. Upon changing the record to "n" the buffering of that record will be deemed complete as shown in 326. Thus, in the instance of data to be buffered in a new location, both the data and the status flag may be buffered and remain unchanged after receipt and processing by the interface buffer.

If a data record exists in the target buffer location the interface buffer may then review the processing code of the record in the target location as shown at 308 and 310. If the processing code is set to "p," the interface may wait a period of time and then recheck the status code of the buffer. If the processing code is set to "n," the processing code may be re set to "p" and the existing data catalogued in the buffer may be supplemented with the new data from the received record as shown at 315. Likewise, if the processing code is "e," the existing data in the buffer may be supplemented with the newly received data. However, unlike the previous instance as shown at 316, the processing code of "e" will be maintained in this case. In either case, supplementation may mean that missing data fields in the buffer are filled existing data is supplemented with more data, or existing data is replaced with more current data.

At 317, the interface buffer may check the status flag of any received data record in order to update the status flag of the buffered record. As described below, these status flags may be used by a downstream system to assist the downstream system in retrieving and using the buffered data. During steps 321-323, using the logic table set out in FIG. 5, the interface buffer may reassign the status flag of the updated record. As shown in FIG. 3, when the status flag of the new record is set to "i" and no previous record existed in the target buffer location, the status flag will remain as an "i." If, however, a record exists in the target buffer location and the status flag of the existing record is set to "u" it will remain unchanged. Comparatively, if the existing record has a status of "d" that may be changed to a "u" while existing "i" will remain unchanged. Should the new record carry a "u" status flag, the same steps may apply with the reset values of the flags being shown at 322. Likewise, should the new record carry a "d" status flag, the same steps would also apply, with the flags shown at 323. In each case, it is preferred that the interface buffer review the status flag of the new and existing record in order to set or reset the status flag of the remaining buffer record to facilitate use of that data by a downstream system.

Once the flag has been set or reset, as shown at 324, the processing code may be reviewed by the interface buffer. If the processing code is set for "e" it should be reset to "n" by the interface buffer as shown in 325.

FIG. 4 contains examples of two data records 400 and 450 that may be transferred to or used in a buffer in accord with the present invention. These data records may contain data fields 402 and 452, as well as flag fields 401, 403, 451, and 453. In use, the data fields may be populated with raw or other data from upstream systems while the flag fields may be used to identify what that data is and what its status is. As described herein, upon receiving the data record, the processing buffer may review the status field and may buffer the record, taking into account this status flag and the identity of the data provided by the upstream system. As the record is processed and buffered, the processing buffer may assign its own flag to the record to designate whether or not the record has been successfully buffered in the correct location. The status flags may be placed within the data records as shown in FIG. 4, they may be positioned outside of the record and simply associated with it as well.

The upstream system may insert Insert Flags (I-Flag), Delete Flags (D-Flag) and Update Flags (U-Flag) into the record, while the buffering system may insert an Error flag (E-Flag), a Posting flag (P-Flag), and an uNprocessed flag (N-Flag) in the record. As described above, the I-flag may indicate that the record being transmitted is new and needs to be inserted into its allocated position for subsequent access. The U-flag, comparatively, may indicate that the record is updated and that an existing I-flag or U-flag record at that location should be further updated with the data in the new U-flagged record. The D-flag, on the other hand, may indicate that the record in the identified location should be deleted.

FIG. 5 is a logic table reflecting processing logic that may be employed in an embodiment of the present invention. The first column in this table reflects the status of the flag for an incoming record. The second column reflects that status of a flag for a record occupying the same location that the new record wishes to occupy and the third column reflects the updated flag designation assigned after the incoming and existing flags are compared. For example, if a data record for a certain location has been designated as an insert record (i.e., an I-Flag) and a insert record already exists in the buffer designation (i.e. an earlier I-Flag record has already been sent) the new record will supplant the existing record and the I-Flag designation will remain. Comparatively, if a delete record (i.e., D-Flag) was sent, it will supplant an insert record (i.e., an I-Flag) as shown in 302.

During processing, to reduce the likelihood that a downstream system will retrieve a record being processed, a processing status flag may be used as described herein. For instance, if a record needs to be updated, as when a U-Flag is received, the data from any revised fields from the newer incoming records may be updated and a temporary P-Flag may be assigned to the record until the update is complete. If the update is complete, the P-Flag may be revised to become an N-Flag. Conversely, if the update is unsuccessful, the buffer assigned processing flag may be updated to become an E-Flag. Once a data record is designated is designated as an E-Flag, user intervention may be required to resolve the data error. To ensure that erroneous data is not retrieved by a downstream system, data records containing E-Flags may be quarantined from these downstream processes or may be otherwise excluded from their use. Once the E-Flag has been removed, the data in the record may be used by the downstream system.

Figure 6:
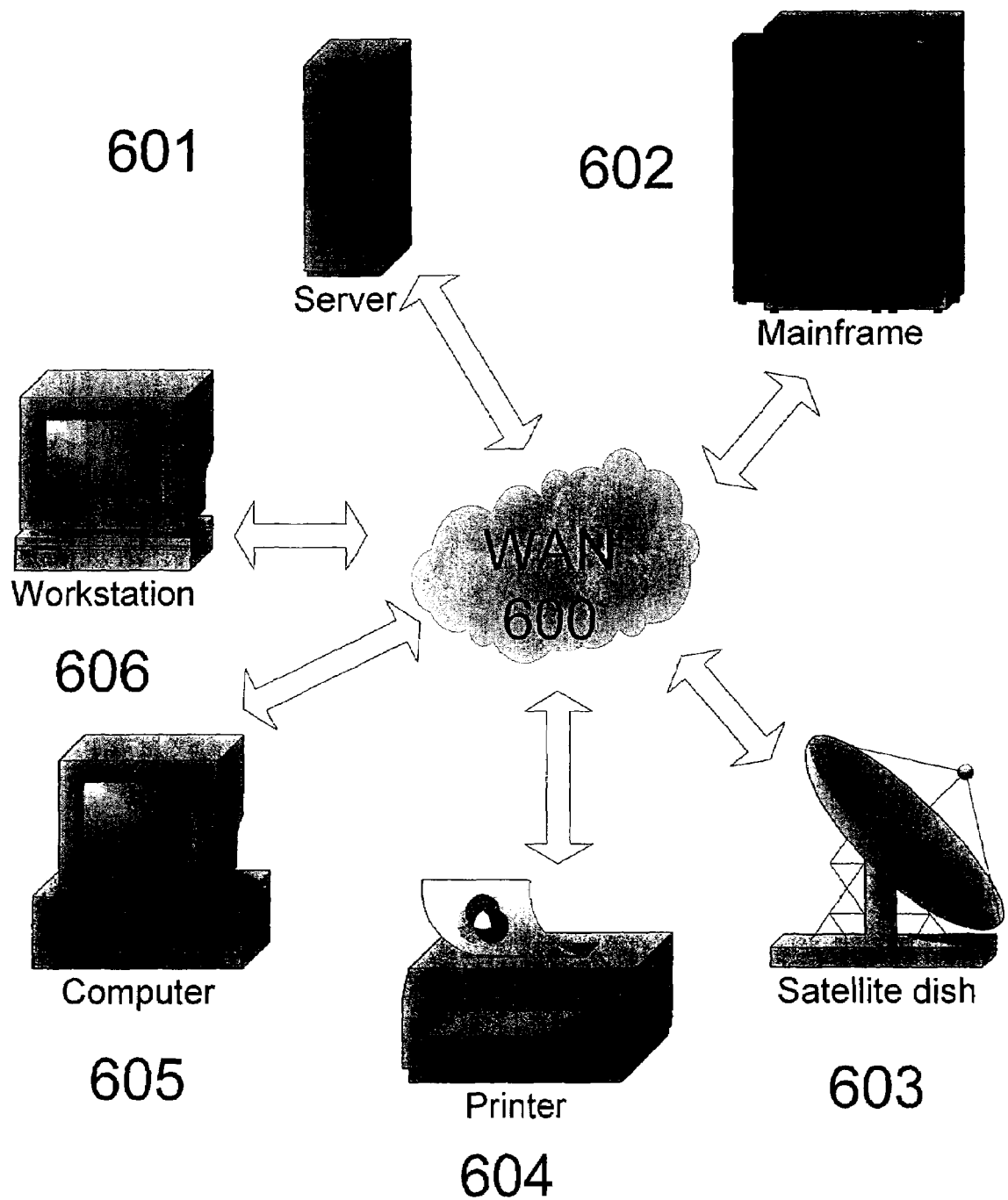
FIG. 6 is a network that may be employed in accord with an embodiment of the present invention.

FIG. 6 is a system that may be employed in accord with the current invention. This system may include a server 601, mainframe 602, workstation 606, computer 605, printer 604, satellite dish 603, and wide area network 600. In this embodiment, the server 601 may act as the buffer while the mainframe 602 may act as a downstream system for analyzing data buffered by the server. The workstation 606, computer 605, and satellite dish 603 may all be creating and sending data records to the server over the wide area network. The printer 604 may be used to output analyzed data from the mainframe as well as to provide any necessary written outputs from the other devices.

The present invention may not only include the methods, systems, and devices described above but it may also include derivations of these systems performed in the same order as well as in other sequences. Moreover, in some embodiments, several sequences may be performed at the same time.

What is claimed is:

1. A method of buffering data between an upstream system sending data to a buffer and a downstream system obtaining data from the buffer, the method comprising:

receiving a data record containing a status flag and a position identifier;

reading the status flag and the position identifier of the received data record; and searching an existing buffer location associated with the received position identifier, wherein when the existing buffer location associated with the received position identifier has an existing record associated with the received position identifier, reviewing the condition of a processing flag associated with the existing record and buffering the received data at the buffer location associated with the position identifier when the processing flag indicates that existing data is not being processed;

reviewing the condition of a status flag of the existing record and the received data record and updating the status flag of the existing record according to a predetermined protocol.

2. The method of claim 1 further comprising:

updating the data in the existing record after reviewing the condition of the status flag.

3. The method of claim 1 further comprising:

updating the data in the existing record after reviewing the condition of the processing flag.

4. The method of claim 1 wherein the predetermined protocol includes changing an existing insert status flag to a delete status flag when the status flag of the received data record is a delete status flag.

5. The method of claim 1 wherein the predetermined protocol includes changing an existing delete status flag to an update status flag when the status flag of the received data record is an insert status flag.

6. The method of claim 1 wherein the predetermined protocol includes changing an existing delete status flag to an update status flag when the status flag of the received data record is an update status flag.

7. The method of claim 1 wherein the predetermined protocol includes changing an existing insert status flag to a delete status flag when the status flag of the received data record is a delete status flag.

8. The method of claim 1 wherein the predetermined protocol includes changing an existing update status flag to a delete status flag when the status flag of the received data record is a delete status flag.

9. The method of claim 1 wherein the predetermined protocol includes changing an existing delete status flag to an update status flag when the status flag of the received data record is an insert status flag.

10. The method of claim 1 wherein the predetermined protocol includes changing an existing update status flag to a delete status flag when the status flag of the received data record is a delete status flag.

11. The method of claim 1 wherein the predetermined protocol includes having an insert status flag condition continue after receiving an insert status flag in a received data record.

12. The method of claim 1 wherein the predetermined protocol includes having a delete status flag condition continue after receiving a delete status flag in a received data record.

13. The method of claim 1 wherein the predetermined protocol includes having an update status flag condition continue after receiving an update status flag in a received data record.

14. The method of claim 1 wherein the received data record includes a header containing a status flag and a payload area containing data.

15. The method of claim 1 further comprising:
sending a query to the buffer to retrieve data associated with a specific position identifier;
checking the condition of a status flag; and
sending data associated with the specific identifier if the condition of the status flag satisfies the predetermined protocol.

16. The method of claim 15 further comprising:
checking the condition of the processing flag;
waiting to send data associated with a specific identifier until the condition of the processing flag indicates that the data is ready to be sent; and,
sending data associated with the specific identifier to a requestor.

17. A data coherency method comprising:
responsive to a request to add a new data record to a data storage system, reading the data storage at a location identified in the request;
if an old data record is present at the identified location, reading a flag from the old data record to determine if it is use; and,
upon determining that the old data record is not in use, marking the flag at the old data record as in use, performing a data storage operation upon the identified location as dictated by the new data record and, thereafter, marking the flag as not in use.

18. The data coherency method of claim 17 further comprising:
responsive to a read request directed to the data storage system at the identified location, reading the flag and,
if the flag identifies the location as in use, deferring the read request until the flag changes to not in use.

19. The data coherency method of claim 17 further comprising:
setting a storage flag at the identified location of the data storage system after reading a storage flag transported with the request.

20. The data coherency method of claim 19 further wherein the storage flag set at the identified location of the data storage system is dictated by any existing storage flags at the identified location and the storage flag associated with the new data record.

21. The data coherency method of claim 20 further comprising verifying the status of the storage flag of the updated storage record prior to performing a data storage operation upon the identified location as dictated by the new data record and the status of the storage flag.

22. The data coherency method of claim 19 wherein the storage flag may be set as an update flag, a delete flag, and an insert flag.

23. A method of buffering data between an upstream system sending data to a buffer and a downstream system obtaining data from the buffer, the method comprising:
receiving a data record containing a status flag and a position identifier;
reading the status flag and the position identifier of the received data record; and
searching an existing buffer location associated with the received position identifier, wherein
when the existing buffer location associated with the received position identifier has an existing record associated with the received position identifier,
reviewing the condition of a processing flag associated with the existing record and buffering the received data at the buffer location associated with the position identifier when the processing flag indicates that existing data is not being processed;
reviewing the condition of a status flag of the existing record and the received data record and updating the status flag of the existing record according to a predetermined protocol; and
storing data at the buffer location if the predetermined protocol is satisfied.

* * * * *